United States Patent Office 3,433,637
Patented Mar. 18, 1969

3,433,637
PHOTOGRAPHIC FILM ROLL
Albert J. Bachelder, Lexington, Mass., assignor to Polaroid Corporation, Cambridge, Mass., a corporation of Delaware
Filed Aug. 7, 1964, Ser. No. 388,145
U.S. Cl. 96—78                        9 Claims
Int. Cl. G03c 3/02

ABSTRACT OF THE DISCLOSURE

A photographic roll film assembly having an elongated slot in its outermost convolution and a tab in its next inner convolution. In the film's rolled condition, the tab protrudes through the slot thereby limiting the maximum diameter of the film roll and releasably retaining the film in a rolled condition.

---

This invention relates to photographic products and particularly to photographic sheet material arranged to be loaded into apparatus such as a camera in roll form and unrolled within the apparatus during use.

The present invention is concerned with improvements in film rolls of the well-known type employed in the Polaroid Land camera and described, for example, in U.S. Patent No. 2,455,111, issued Nov. 30, 1948. Film rolls of this type include an elongated sheet coiled in a roll and having a leading end section constituting a leader for threading the sheet through the camera as the bulk of the sheet is loaded as a roll into the camera. In U.S. Patent No. 2,630,385, issued Mar. 3, 1953, sealing means are described for retaining the sheet in a coiled or rolled-up form during handling and loading while readily releasing the roll when the leading end of the sheet is pulled to advance the sheet from the roll within the camera.

Objects of the present invention are: to provide a photographic roll film assembly of the type described, including novel and improved means for releasably retaining the sheet in rolled-up form; to provide retaining means consisting of portions of the sheet itself; and to provide retaining means assuring more accurate control over the diameter of the roll.

Another object of the invention is to provide a novel and improved method of coiling and retaining coiled, lengths of photographic sheet material.

Other objects of the invention will be in part obvious and will in part appear hereinatfer.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

The "Polaroid Land Picture Roll," in which the present invention constitutes an improvement, and the Polaroid Land camera in which the picture roll is employed, are both very familiar products requiring little additional explanation and description. The picture roll comprises a roll of a photosensitive image-recording sheet usually coiled about a spool or other means for preventing exposure of the light-sensitive material, and a second or print-receiving sheet including an image-receiving layer for receiving and supporting a diffusion transfer image and also mounting rupturable containers of a liquid reagent adapted to be distributed between the image-recording and print-receiving sheets to effect image formation. The print-receiving sheet is coiled and coupled at its leading end with a leader sheet comprising an extension of the image-recording sheet and adapted, together with the leading end section of the second sheet, to function as a leader for threading the sheets through the apparatus. As noted in the aforementioned Patent No. 2,630,385, the two sheets are loaded into the camera in a rolled-up form and include sealing or retaining means for retaining the sheets in rolled-up form during handling and loading while easily breaking or releasing to permit unrolling of the sheets when the leader is pulled to advance the sheets within the camera.

The present invention contemplates an improved roll-retaining means consisting of portions of the rolled sheet and depending for its operation on a mechanical locking action while readily releasing within the camera when the leading end of the sheet is pulled. In addition to these advantages, the roll-retaining means of the invention provide for a more accurate and uniform control over the diameter of the roll of sheet material and facilitate coiling and retaining the roll during manufacture.

Figure 1:
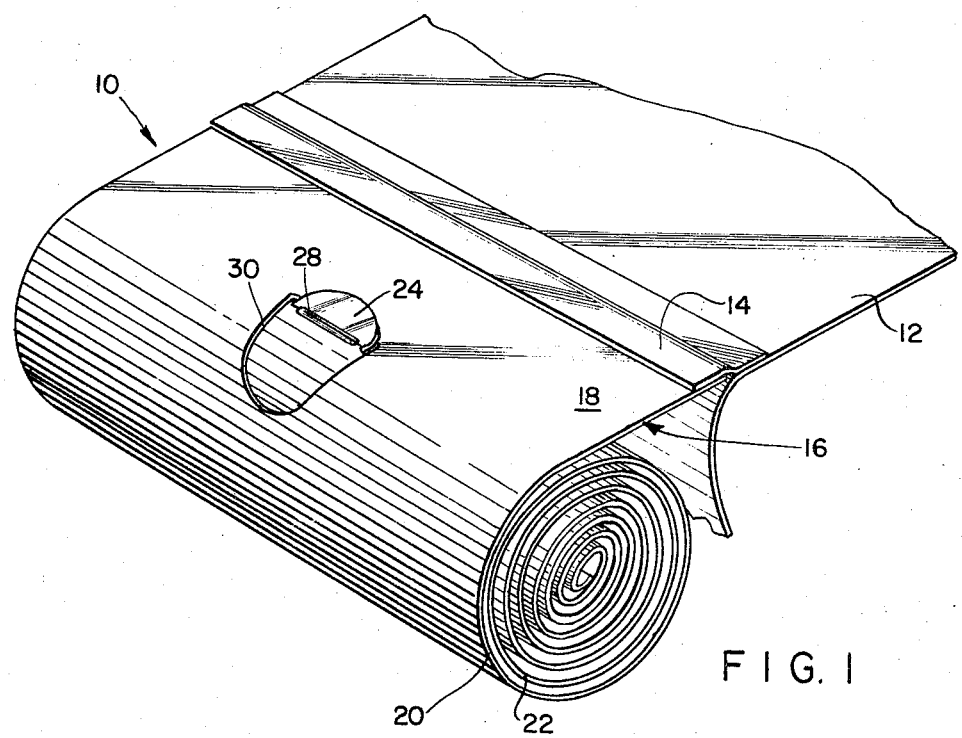
FIGURE 1 is a fragmentary perspective view of a roll film assembly embodying the invention.
Figure 2:
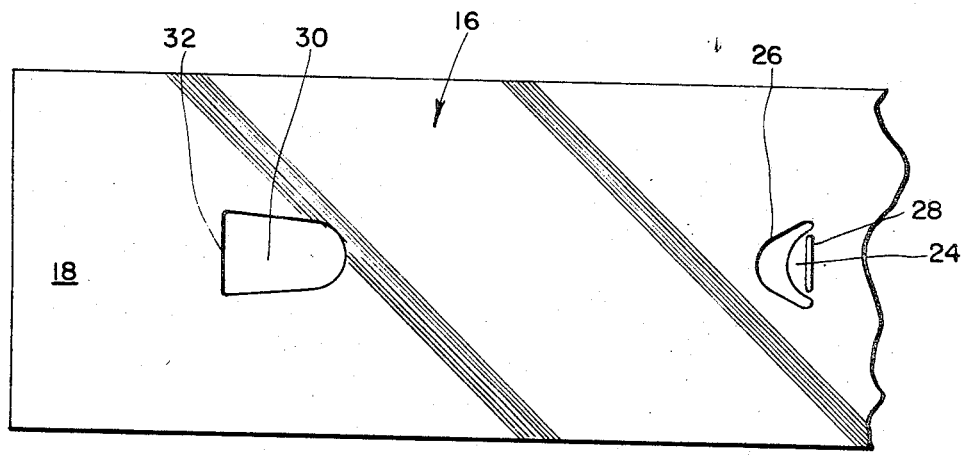
FIG. 2 is a fragmentary plan view of a portion of the assembly of FIGURE 1.

Reference is now made to FIGS. 1 and 2 of the drawings wherein there is shown a portion of the roll film assemblage embodying the invention. The roll film assembly, designated 10, includes a photosensitive sheet or leader 12 attached thereto, coupled by a connecting strip 14 to a second or print-receiving sheet 16. Sheet 16 includes a leading end section 18 attached at its leading edge to sheet 12 and is coiled in the form of a roll having a plurality of convolutions including an outer convolution 20 and the next inner convolution 2. Outer convolution 20 is releasably secured to inner convolution 22 in order to retain the roll intact and prevent uncoiling of the sheet while permitting uncoiling of the sheet within apparatus such as a camera when leading end section 18 of sheet 16 is pulled to advance the sheet through the camera. While the roll-retaining means is shown for the image-receiving sheet, it should be understood that the construction shown and claimed has equal utility for releasably retaining the photosensitive sheet in a coiled condition.

The roll-retaining means are required to be both easily releasable within the camera yet sufficiently secure to insure that the roll does not uncoil prematurely during handling and loading, and comprise a tongue 24 formed in the portion of sheet 16 comprising inner convolution 22, formed, for example, by forming a generally U-shaped cut or opening 26 in sheet 16. Tongue 24 extends in the direction of the leading edge of sheet 16 and may be embossed with a narrow depression 28 at its base in order to stiffen the tongue and cause the tongue to bend or project outwardly when the sheet is coiled. Sheet 16 is provided between tongue 24 and its leading edge with an opening 30 having a leading edge 32 extending transversely of the sheet and at least equal in length to the width of the base of the tongue. Leading edge 32 is predeterminedly spaced from the base of the tongue and this spacing determines the length of outer convolution 20 and thus the circumference and diameter of the roll. In the rolled-up form of sheet 16, tongue 24 extends through opening 30 toward the leading edge of sheet 16 and is engaged at its base with leading edge 32 of the opening.

Sheet 16 comprises a material such as paper, e.g., baryta paper, or an organic plastic film such as cellulose acetate, which has some resiliency and therefore tends to uncoil if released. This tendency of the sheet to uncoil, however slight, causes the convolutions 20 and 22 of the sheets to tend to slip with respect to one another in directions such that tongue 24 is urged toward the leading edge of the sheet while leading edge 32 of opening 30 is urged against the base of the tongue, thereby effectively retaining the tongue in engagement with the outer convolution of sheet 16 at leading edge 32 of opening 30.

Figure 4:
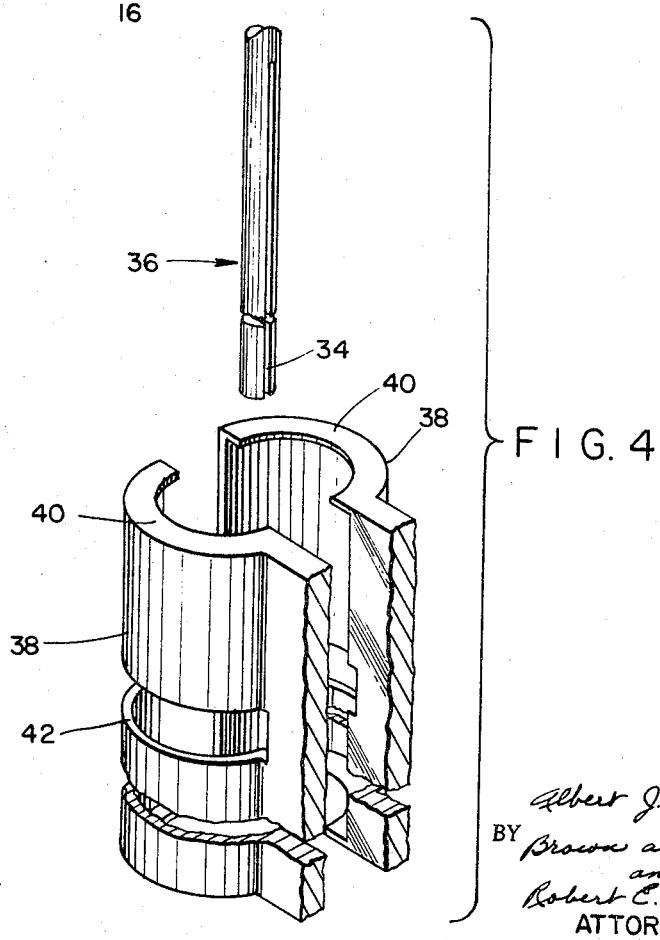
FIG. 4 is a fragmentary perspective view of components of apparatus for practicing the method of the invention.

The tendency of sheet 16 to uncoil due to its inherent resiliency and the novel retaining means are both taken advantage of in the manufacture of the film to facilitate coiling and fastening of the sheet and provide for very accurate control of the outer diameter of the rolled-up sheet. Referring now to FIG. 4, sheet 16 is coiled by inserting the leading end portion of the sheet into a slot 34 in a mandrel 36 and rotating the mandrel while maintaining tension on the sheet until the sheet is completely coiled. The rolled-up sheet is then loosely gripped between a pair of cylindrical holders 38 having inwardly extending lips 40 on their ends and the mandrel is then withdrawn. It is at this point that one of the major advantages of the present roll-retaining means becomes apparent, because retaining of the sheet in rolled-up form is positively assured and requires no further operation to be performed such as insuring a good bond between a contact adhesive and another surface. Sheet 16 is wound about mandrel 36 in a coil having a diameter slightly less than the desired diameter so that tongue 24 is located underlying outer convolution 20 in contact with a portion of the outer convolution intermediate the tongue and opening 32. When mandrel 36 is withdrawn and while the roll is held loosely between holders 38, the roll is permitted to expand and the expansion process involves slipping of convolutions 20 and 22 relative to and past one another, bringing tongue 24 into alignment with hole 30 and allowing the tongue to project outwardly through the opening, and the slippage and expansion of the roll continues until the base of the tongue is engaged with leading edge 32 of the opening. Holders 38 are provided with circumferential slots 42 so that the holders do not interfere with the outward projection of the tongues into opening 30. Because the distance between the base of the tongue and leading edge 32 can be precisely controlled, the circumference of the outer convolution and hence diameter of the picture roll is also subject to a precise control not found possible by prior art practices.

Figure 3:
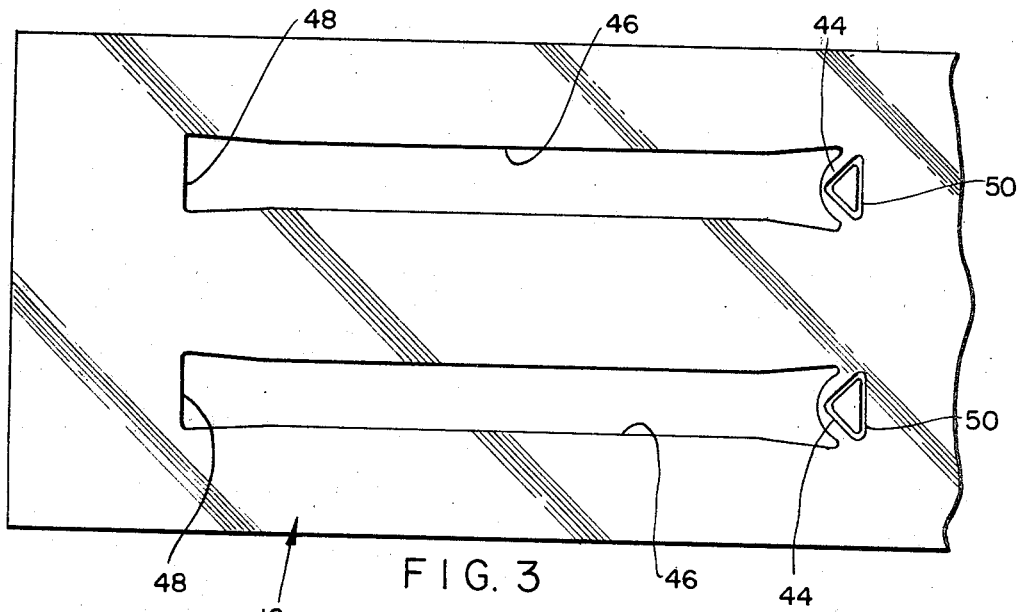
FIG. 3 is a plan view, similar to FIG. 2, illustrating another embodiment of the film assembly.

The roll-retaining means has been shown and described until now as comprising a single tongue and opening, and it should be apparent that it is also possible, and in some instances desirable, to provide two or more pairs of tongues and openings of the type described. Such an arrangement is shown in FIG. 3 of the drawings in which there is illustrated the leading end portion of a print-receiving sheet of the type shown in the copending U.S. patent application of Albert J. Bachelder, Ser. No. 323,686, filed Nov. 14, 1963 now U.S. Patent No. 3,270,653. In this type of picture roll, the print-receiving sheet is formed with one or more elongated openings and the negative or image-recording sheet is provided with spacing members aligned with the openings for spacing the fluid-spreading pressure-applying members apart and permitting movement of one of the sheets with respect to the other between the pressure-applying members of the camera in order to properly register the two sheets. In the form shown in FIG. 3, tongues 44 are defined by elongated openings 46 which extend from the base of the tongues to transverse leading edges 48 predeterminedly spaced from the bases of the tongues by distances which determine the circumference of the outer convolution of the sheet. Openings 46 may be slightly divergent, as shown, near their ends, and leading edge 48 of each opening is equal in length to the base of the tongue with which it is engaged. To insure outward projection of each tongue 44 through opening 46, the tongue may be embossed, as shown, with a generally triangular depression 50 which, when viewed from the opposite side of the sheet, constitutes ribs for stiffening the tongue. Although the tongues shown in the drawings are formed with embossed depressions or stiffening ribs, this arrangement may not prove necessary, particularly when sheet materials are employed having sufficient inherent stiffness to insure that the tongue will project through the opening into engagement with the leading edge thereof.

The rolled-up sheet is usually loaded into a compartment in the camera having a slot or similar opening through which leading end 18 is threaded, and shaped to permit the sheet to unroll freely within the chamber. As the leading end of sheet 16 is withdrawn from the chamber, it is advanced in a direction generally radially with respect to the remainder of the roll, bending the tongue backward upon itself until the portion of the sheet providing the leading edge of the opening is disengaged from the tongue. During unrolling, it is essentially only the resiliency or the resistance to bending of the material comprising the tongue which retains the two outer convolutions of the sheets together, and this resistance to bending of the sheets is very easily overcome and requires little effort.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a photographic roll film assembly comprising a length of sheet material formed into a roll adapted to be loaded into photographic apparatus, at least a portion of an outer convolution of said sheet material constituting a leader for threading said sheet material into a photographic apparatus, means comprising portions of said sheet material for releasably securing an outer convolution of said roll to the next inner convolution of said roll so that the last-mentioned outer convolution and the convolutions thereunder are restrained from unwinding, said means comprising, in combination:

a tongue formed in a medial portion of said sheet, extending toward the leading end of said sheet and spaced from said leading end of said sheet by a distance exceeding the length of said last-mentioned outer convolution; and an opening formed in said sheet between said tongue and said leading end, said opening being dimensioned to automatically admit said tongue and having a leading edge located closest said leading end, predeterminedly spaced from the base of said tongue, extending transversely of the length of said sheet and at least equal in length to the width of said base of said tongue;

said tongue projecting outwardly through said opening with said sheet at said edge engaged with said tongue at said base thereof releasably retaining said convolution including said opening in engagement with said inner convolution including said tongue to prevent said convolutions from slipping relative to each other in a direction which would tend to increase the diameter of the roll.

2. The roll film assembly of claim 1 in which said tongue is formed and defined by a generally U-shaped cut in said sheet.

3. The roll film assembly of claim 1 in which said opening is elongated and extends lengthwise of said sheet from said leading edge to said tongue.

4. The roll film assembly of claim 1 in which said sheet is sufficiently resilient to cause said roll to expand by slippage of said convolutions relative to one another and said convolutions of said roll are coiled sufficiently loose to allow said slippage to occur.

5. The roll film assembly of claim 1 in which said sheet is embossed in the region of said base of said tongue causing said tongue to project outwardly.

6. The roll film assembly of claim 1 in which a plurality of said tongues and said openings are formed in said sheet and each of said tongues is engaged in one of said openings.

7. The roll film assembly of claim 1 in which said sheet is coupled at said leading end with a second sheet, one of said sheets includes a photosensitive image-recording material and the other of said sheets includes an image-receiving material for receiving an image formed by diffusion transfer of substances from said one sheet.

8. The method of coiling an elongated photosensitive sheet in a roll of predetermined diameter and fastening said sheet so that said roll remains coiled, said method comprising:
  piercing said sheet near the leading end thereof to form a tongue extending toward said leading end;
  forming an opening in said sheet between said tongue and said leading end for receiving said tongue, said opening being defined by a transverse leading edge predeterminedly spaced from the base of said tongue;
  coiling said sheet until the portion of said sheet including said opening constitutes the outer convolution of said roll and said leading edge of said opening overlies a portion of said sheet adjacent the end of said tongue between the latter and said edge; and
  permitting said roll to expand slightly so that at least the two outer convolutions of said roll slip relative to and past one another until said tongue projects outwardly through said opening and is engaged at its base with said edge of said opening.

9. The method of claim 8 in which said roll is coiled about a mandrel, is loosely gripped externally and said mandrel is withdrawn axially from said roll to permit said roll to expand until said tongue is engaged in said opening.

References Cited

UNITED STATES PATENTS

| | | | |
|---|---|---|---|
| 485,905 | 11/1892 | Beauchamp | 135—26 |
| 1,239,976 | 9/1917 | Simonson | 206—59 |
| 2,630,385 | 3/1953 | Wolff | 96—78 |

NORMAN G. TORCHIN, *Primary Examiner.*

R. E. FICHTER, *Assistant Examiner.*